(12) United States Patent
El-Maleh et al.

(10) Patent No.: US 7,969,902 B2
(45) Date of Patent: Jun. 28, 2011

(54) TANDEM-FREE VOCODER OPERATIONS BETWEEN NON-COMPATIBLE COMMUNICATION SYSTEMS

(75) Inventors: Khaled Helmi El-Maleh, San Marcos, CA (US); Ananthapadmanabhan Arasanipalai Kandhadai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 160 days.

(21) Appl. No.: 12/504,094

(22) Filed: Jul. 16, 2009

(65) Prior Publication Data

US 2009/0281799 A1    Nov. 12, 2009

Related U.S. Application Data

(63) Continuation of application No. 10/282,831, filed on Oct. 28, 2002, now Pat. No. 7,808,920.

(51) Int. Cl.
| | |
|---|---|
| H04L 1/00 | (2006.01) |
| H04L 12/26 | (2006.01) |
| H04L 12/66 | (2006.01) |
| H04L 12/28 | (2006.01) |
| H04L 12/58 | (2006.01) |
| H04J 3/16 | (2006.01) |
| H04J 3/22 | (2006.01) |

(52) U.S. Cl. ......... 370/252; 370/353; 370/401; 370/466
(58) Field of Classification Search .................. 370/252, 370/352–356, 401, 466
See application file for complete search history.

(56) References Cited

U.S. PATENT DOCUMENTS

| | | | |
|---|---|---|---|
| 4,901,307 A | 2/1990 | Gilhousen et al. | |
| 5,103,459 A | 4/1992 | Gilhousen et al. | |
| 5,857,147 A | 1/1999 | Gardner et al. | |
| 5,956,673 A | 9/1999 | Weaver et al. | |
| 5,995,923 A | 11/1999 | Mermelstein et al. | 704/19 |
| 7,023,880 B2 | 4/2006 | El-Maleh et al. | |
| 2002/0131377 A1 | 9/2002 | DeJaco et al. | |
| 2002/0191693 A1 | 12/2002 | Nakagaki | |
| 2002/0196762 A1 | 12/2002 | Choi et al. | |
| 2004/0004957 A1 | 1/2004 | Rabipour et al. | |
| 2004/0110539 A1 | 6/2004 | El-Maleh et al. | |

FOREIGN PATENT DOCUMENTS

| | | |
|---|---|---|
| EP | 1083762 | 9/1999 |
| EP | 1014738 | 12/1999 |
| JP | 2001500344 | 1/2001 |
| RU | 2145775 | 2/2000 |
| WO | 9632823 | 10/1996 |
| WO | WO9944377 A1 | 9/1999 |

(Continued)

OTHER PUBLICATIONS

International Search Report—PCT/US03/034566, International Searching Authority—European Patent Office, Apr. 26, 2004.

(Continued)

*Primary Examiner* — Ronald Abelson
(74) *Attorney, Agent, or Firm* — Kyong Macek; Michael Dehaemer; Espartaco Diaz Hidalgo

(57) ABSTRACT

Tandem-free vocoder operations (TFO) between non-compatible communication systems may be enabled through hardware modifications at communication elements within each system. In one aspect, each infrastructure entity in System 1 comprises an intra-system TFO Frame Generator $G_1$, an intra-system TFO Frame Extractor $E_1$, and a TFO Frame Extractor $E_2$ of System 2, which is non-compatible to System 1. Each infrastructure entity in System 2 comprises an intra-system TFO Frame Generator $G_2$, an intra-system TFO Frame Extractor $E_2$, and a TFO Frame Extractor $E_1$ of System 1.

16 Claims, 9 Drawing Sheets

FOREIGN PATENT DOCUMENTS

WO    WO0105109 A1    1/2001

OTHER PUBLICATIONS

International Preliminary Report on Patentability—PCT/US03/034566, IPEA/US—Alexandria, VA Nov. 2, 2007.

"Digital Cellular telecommunication system (phse 2+) (GSM); Universal Movile Telecommunications System (UMTS); Inband Tandem Free Operation (TFO) of speech codecs; Service Description; Stage 3 (3GPP TS 23.062 version 5.0.0. Release 5)" ETSI TS 128 062 V2.0.0., XX, XX, Mar. 2002, pp. 14-19, 35.

TANDEM-FREE VOCODER OPERATIONS BETWEEN NON-COMPATIBLE COMMUNICATION SYSTEMS

This application is a continuation of U.S. patent application Ser. No. 10/282,831, filed Oct. 28, 2002, now pending, entitled "Tandem-Free Vocoder Operations Between Non-Compatible Communication Systems." The foregoing described application is herein incorporated by reference in its entirety.

BACKGROUND

I. Field

The present invention relates to data communication. More particularly, the present invention relates to harmonizing vocoder operations between non-compatible communication systems.

II. Description of the Related Art

The field of wireless communications has many applications including, e.g., cordless telephones, paging, wireless local loops, personal digital assistants (PDAs), Internet telephony, and satellite communication systems. A particularly important application is cellular telephone service for remote subscribers. As used herein, the term "cellular" system encompasses systems using either cellular or personal communications services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well-known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA. Another CDMA standard is the W-CDMA standard, as embodied in 3rd Generation Partnership Project "3GPP", Document Nos. 3G TS 25.211, 3G TS 25.212, 3G TS 25.213, and 3G TS 25.214.

Each standard defines how various types of information are processed for transmission. In a typical communication system, an encoder generates a stream of information bits representing voice or data traffic. This stream of bits is subdivided and grouped, concatenated with various control bits, and packed into a suitable format for transmission. Voice and data traffic can be transmitted in various formats according to the appropriate communication standard, such as, e.g., frames, packets, and subpackets. For illustrative ease, the term "frame" will be used herein to describe the transmission format in which traffic is carried over the transmission medium. However, the term "frame" will also be used herein to describe the output of a speech coder. The definition of the word will depend upon the context in which the word is used.

A speech coder is a device that extracts parameters relating to a model of human speech generation and then uses these parameters to compress the speech for transmissions. Speech coders typically comprise an encoder and a decoder. A speech coder divides the incoming speech signal into blocks of time, or analysis frames. The encoder analyzes the incoming speech frame to extract certain relevant parameters, and then quantizes the parameters into binary representation. The binary representation is packed into transmission frames and is transmitted over a communication channel to a receiver with a decoder. The decoder processes the transmission frames, unquantizes them to produce the parameters, and resynthesizes the speech frames using the unquantized parameters. Speech coders are also referred to as voice coders, or "vocoders," and the terms will be used interchangeably herein.

The function of the speech coder is to compress the digitized speech signal into a low-bit-rate signal by removing all of the natural redundancies that are inherent in speech. The digital compression is achieved by representing the input speech frame with a set of parameters and employing quantization to represent the parameters with a set of bits. If the input speech frame has a number of bits Ni and the output frame produced by the speech coder has a number of bits No, then the compression factor achieved by the speech coder is $C_r = N_i/N_o$. The challenge is to retain the high voice quality of the decoded speech while achieving a target compression factor. The performance of a speech coder depends on how well the speech model, or the combination of the analysis and synthesis process described above, performs, and how well the parameter quantization process is performed at the target bit rate of $N_o$ bits per frame. Thus, the goal of the speech model is to capture the essence of the speech signal, or the target voice quality, with a small set of parameters for each frame.

Different types of speech coders are deployed in the various existing wireless communication systems, often using quite dissimilar speech compression techniques. Moreover, the transmission frame formats and processing that are defined by one particular standard is most likely different from those of other standards. For example, CDMA standards support the use of variable-rate vocoder frames in a spread spectrum environment while GSM standards support the use of fixed-rate vocoder frames and multi-rate vocoder frames. Similarly, Universal Mobile Telecommunications Systems (UMTS) standards also support fixed-rate and multi-rate vocoders, but not variable-rate vocoders. For compatibility and interoperability between these non-compatible communication systems, it is highly desirable to enable the support of variable-rate vocoder frames within GSM and UMTS systems, and the support of non-variable rate vocoder frames within CDMA systems. An example of a variable-rate vocoder is the Selectable Mode Vocoder (SMV), which is promulgated in IS-893; an example of a multi-rate vocoder is the Adaptive Multi-Rate (AMR) vocoder, which is promulgated in "ETSI EN 301 704 Digital Cellular Telecommunications System; Adaptive Multi-Rate (AMR) Speech Transcoding" (the AMR standard); and an example of a fixed-rate vocoder is a Enhanced Full Rate vocoder, which is promulgated in 3GPP TS 46.060: "Digital cellular telecommunications system (Phase 2+); Enhanced Full Rate (EFR) speech transcoding."

One significant reason for promoting compatibility and interoperability between non-compatible systems is to enable the use of wideband vocoders between non-compatible systems. A "wideband" vocoder is one that codes speech within a frequency range of 7000 Hz. In a traditional landline telephone system, the transmission medium and terminals are bandlimited to 4000 Hz, so speech is typically transmitted in a narrow range of 300 Hz to 3400 Hz, with control and signaling overhead carried outside this range.

In view of the physical constraints of landline telephone systems, signal propagation within cellular telephone systems is implemented with these same narrowband frequency constraints so that calls originating from a cellular subscriber unit can be transmitted to a landline unit. However, cellular telephone systems are capable of transmitting signals with wider frequency ranges, since the physical limitations requiring a narrow frequency range are not present within the cellular system. An exemplary standard for generating signals with a wider frequency range is promulgated in document G.722 ITU-T, entitled "7 kHz Audio-Coding within 64 kBits/s," published in 1989. Accordingly, wideband counterparts of the variable-rate and multi-rate vocoders recited above have been developed. The wideband counterparts provide superior acoustical benefits over the narrowband vocoders.

When wideband signals are exchanged between two wideband terminals operating within a cellular system, additional processing and constraints must be imposed because the wideband signals are too "fat" for the narrowband transmission channel. Currently, the maximum data capacity for a public switched telephone network (PSTN) is 64 kbps. For a narrowband signal, 8000 samples/second must be obtained for accurate reconstruction of the original signal. Standard pulse code modulation (PCM) sample data is represented using 8-bit symbols. By using 8-bit symbols, the maximum data capacity of the PSTN connection is reached (8000 samples/sec×8 bits/sample=64,000 bps) while minimizing quantization errors. However, for a wideband signal, 16,000 samples/second must be obtained for accurate reconstruction of the original signal. Hence, the wideband signal is too "fat" for the narrowband transmission channel.

The problems arising from the physical constraints of the 64 kbps PSTN connection can be avoided by implementing tandem-free operations (TFO) between infrastructure entities in the network. Tandem-free operations refer to the bypass of vocoders within infrastructure entities in the network. When a tandem-free operation is implemented, a wideband signal from one terminal of the network can be conveyed over the PSTN to another terminal in the same network through the use of punctured 8-bit PCM symbols, wherein vocoder output bits are punctured into the PCM symbols.

In order to implement tandem-free operations, the vocoders at the transmission end and the receiving end must be compatible. This is not a problem when wideband signals are exchanged between terminals within the same communication network. U.S. patent application Ser. No. 09/811,056, now U.S. Pat. No. 7,289,461, entitled "COMMUNICATIONS USING WIDEBAND TERMINALS," filed on, addresses this problem. However, there is a problem when one wishes to exchange wideband signals between terminals of non-compatible networks.

For example, in a multiple access system such as CDMA, variable-rate vocoders are implemented. An example of a variable-rate vocoder is the Wideband Selectable Mode Vocoder (B-SMV). However, in a multiple access system such as GSM, fixed-rate or multi-rate vocoders are implemented. An example of a multi-rate vocoder is the Wideband Adaptive Multi-Rate Vocoder (AMR-WB). Although the vocoder types are structurally and functionally different, it should be noted that common, generic terminology is shared between the vocoder types. For example, a "mode" in an AMR-WB vocoder refers to a vocoder frame with a fixed data rate. However, a "mode" in a WB-SMV vocoder refers to an average data rate, which is achieved by a mixture of different frame types. The meaning of the word should be read in context with the usage of the word. In order to minimize the confusion that might arise from using such commonly shared terms between the numerous types of vocoders, the embodiments that will be described below will use the WB-SMV vocoder configurations and terminology to represent variable-rate vocoders and the AMR-WB vocoder configurations and terminology to represent fixed-rate and multi-rate vocoders, rather than the narrowband versions. However, it should be understood that the configuration details could be extended to suit other vocoders without undue experimentation. The technical specification for the AMR-WB frame structure is found in the document 3GPP TS 26.201 V5.0.0 (2001-03). The technical specification for the WB-SMV frame structure is yet to be released.

Accordingly, the embodiments that are described below are for harmonizing the transmission of wideband signals between different vocoders of non-compatible systems, so that the acoustical benefits of wideband vocoders need not be sacrificed in transmissions between non-compatible systems.

SUMMARY

Methods and apparatus are presented herein to enable tandem-free operations between non-compatible systems. In one aspect, an apparatus is presented for harmonizing operations between a first vocoder of a communication system and a second vocoder of a second communication system, the apparatus comprising: a first extraction element for extracting tandem-free operation (TFO) information from a received intra-system TFO frame; a second extraction element for extracting TFO information from a received intersystem TFO frame; and a selection element communicatively coupled to the first extraction element and the second extraction element, wherein the selection element is for selecting either extraction element depending upon whether a received frame is an intra-system TFO frame or an intersystem TFO frame.

In another aspect, a method is presented for harmonizing a tandem-free operation feature of a first communication system with a tandem-free operation feature of a second communication system, the method comprising: at a first infrastructure entity of the first communication system, determining extraction capabilities of a second infrastructure entity of the second communication system; selecting an appropriate tandem-free operation (TFO) frame format; encapsulating a vocoder frame into a TFO frame using the appropriate TFO frame format; transmitting the TFO frame to the second infrastructure entity; receiving the TFO frame at the second infrastructure entity; determining a source type of the TFO frame; extracting the contents of the TFO frame according to the source type of the TFO frame.

In another aspect, an apparatus is presented for harmonizing a tandem-free operation feature of a first communication system with a tandem-free operation feature of a second communication system, the apparatus comprising: at a first infrastructure entity of the first communication system, means for determining extraction capabilities of a second infrastructure entity of the second communication system; means for selecting an appropriate tandem-free operation (TFO) frame format and encapsulating a vocoder frame into a TFO frame using the appropriate TFO frame format; means for transmitting the TFO frame to the second infrastructure entity; means for receiving the TFO frame at the second infrastructure entity; and means for determining a source type of the TFO frame and extracting the contents of the TFO frame according to the source type of the TFO frame.

In another aspect, an apparatus is presented for harmonizing operations between a first vocoder of a communication system and a second vocoder of a second communication system, the apparatus comprising: at least one memory element; and at least one processing element, the processing element configured to implement a set of instructions stored in the at least one memory element, the set of instructions for: extracting tandem-free operation (TFO) information from a received intra-system TFO frame using a first table; and extracting TFO information from a received intersystem TFO frame using a second table, wherein a intra-system TFO frame has the same fields as a intersystem TFO frame but the first table and the second table have different bit definitions.

DETAILED DESCRIPTION

Figure 1:
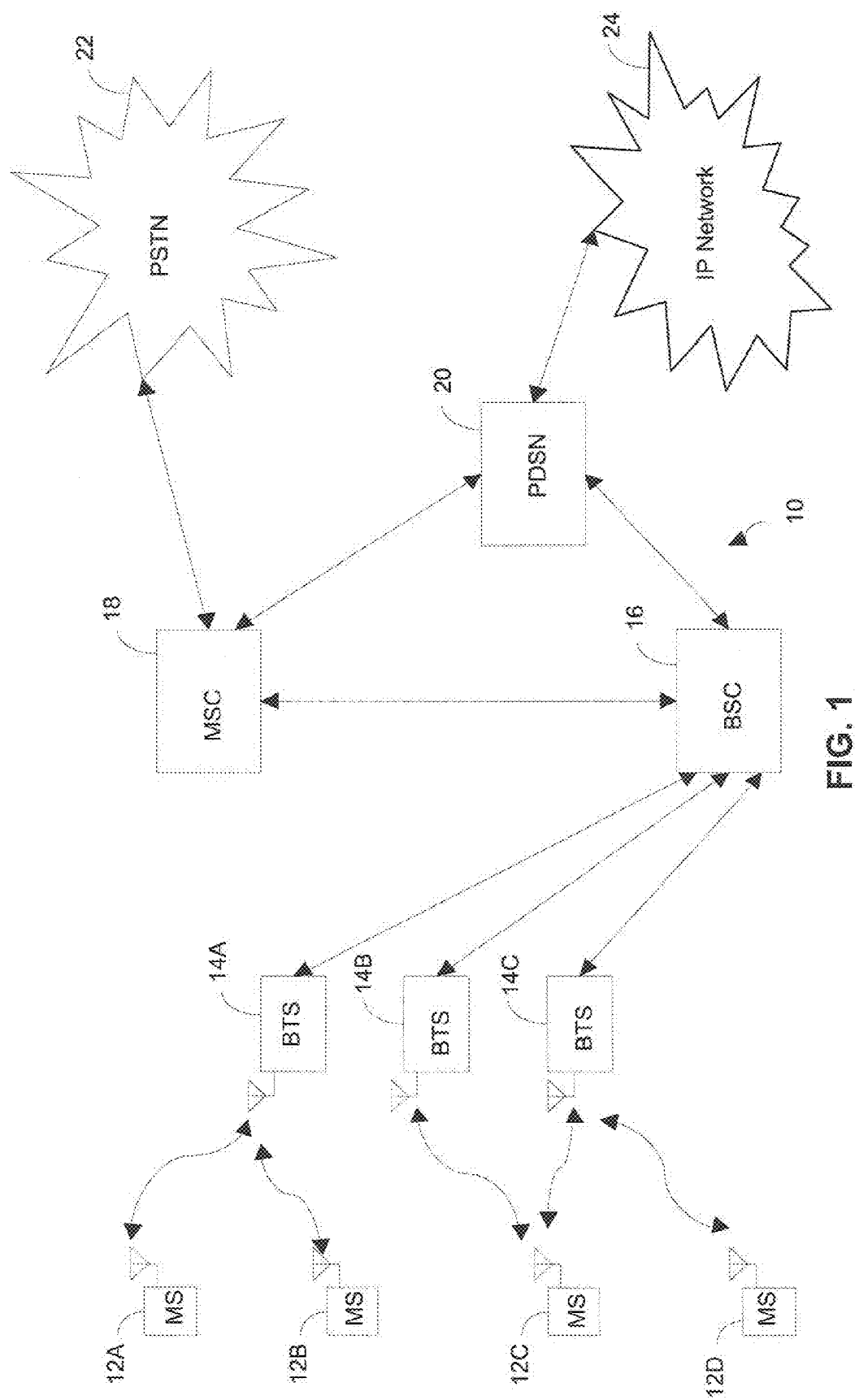
FIG. 1 is a diagram of a communication system that supports a number of users.

As illustrated in FIG. 1, a wireless communication network 10 generally includes a plurality of remote stations (also called subscriber units or mobile stations or user equipment) 12a-12d, a plurality of base stations (also called base station transceivers (BTSs) or Node B). 14a-14c, a base station controller (BSC) (also called radio network controller or packet control function 16), a mobile switching center (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four remote stations 12a-12d, three base stations 14a-14c, one BSC 16, one MSC 18, and one PDSN 20 are shown. It would be understood by those skilled in the art that there could be any number of remote stations 12, base stations 14, BSCs 16, MSCs 18, and PDSNs 20.

In one embodiment, the wireless communication network 10 is a packet data services network. The remote stations 12a-12d may be any of a number of different types of wireless communication device such as a portable phone, a cellular telephone that is connected to a laptop computer running IP-based Web-browser applications, a cellular telephone with associated hands-free car kits, a personal data assistant (PDA) running IP-based Web-browser applications, a wireless communication module incorporated into a portable computer, or a fixed location communication module such as might be found in a wireless local loop or meter reading system. In the most general embodiment, remote stations may be any type of communication unit.

The remote stations 12a-12d may advantageously be configured to perform one or more wireless packet data protocols such as described in, for example, the EIA/TIA/IS-707 standard. In a particular embodiment, the remote stations 12a-12d generate IP packets destined for the IP network 24 and encapsulates the IP packets into frames using a point-to-point protocol (PPP).

In one embodiment the IP network 24 is coupled to the PDSN 20, the PDSN 20 is coupled to the MSC 18, the MSC is coupled to the BSC 16 and the PSTN 22, and the BSC 16 is coupled to the base stations 14a-14c via wirelines configured for transmission of voice and/or data packets in accordance with any of several known protocols including, e.g., El, Ti, Asynchronous Transfer Mode (ATM), Internet Protocol (IP), Point-to-Point Protocol (PPP), Frame Relay, High-bit-rate Digital Subscriber Line (HDSL), Asymmetric Digital Subscriber Line (ADSL), or other generic digital subscriber line equipment and services (xDSL). In an alternate embodiment, the BSC 16 is coupled directly to the PDSN 20, and the MSC 18 is not coupled to the PDSN 20.

During typical operation of the wireless communication network 10, the base stations 14a-14c receive and demodulate sets of reverse link signals from various remote stations 12a-12d engaged in telephone calls, Web browsing, or other data communications. As used herein, the "reverse link" comprises transmissions from a remote station directed towards a base station. Each reverse link signal received by a given base station 14a-14c is processed within that base station 14a-14c. Each base station 14a-14c may communicate with a plurality of remote stations 12a-12d by modulating and transmitting sets of forward link signals to the remote stations 12a-12d. As used herein, the "forward link" comprises transmissions from a base station directed towards a remote station. For example, as shown in FIG. 1, the base station 14a communicates with first and second remote stations 12a, 12b simultaneously, and the base station 14c communicates with third and fourth remote stations 12c, 12d simultaneously. The resulting packets are forwarded to the BSC 16, which provides call resource allocation and mobility management functionality including the orchestration of soft handoffs of a call for a particular remote station 12a-12d from one base station 14a-14c to another base station 14a-14c. For example, a remote station 12c is communicating with two base stations 14b, 14c simultaneously. Eventually, when the remote station 12c moves far enough away from one of the base stations 14c, the call will be handed off to the other base station 14b. In a W-CDMA system, which is classified as a UMTS system, the terminology of the wireless communication system components differs, but the functionality is the same. For example, a base station is referred to as a Radio Network Controller (RNC) operating in a UMTS Terrestrial Radio Access Network (U-TRAN). The forward link is referred to as the "downlink" and the reverse link is referred to as the "uplink."

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

Figure 2:
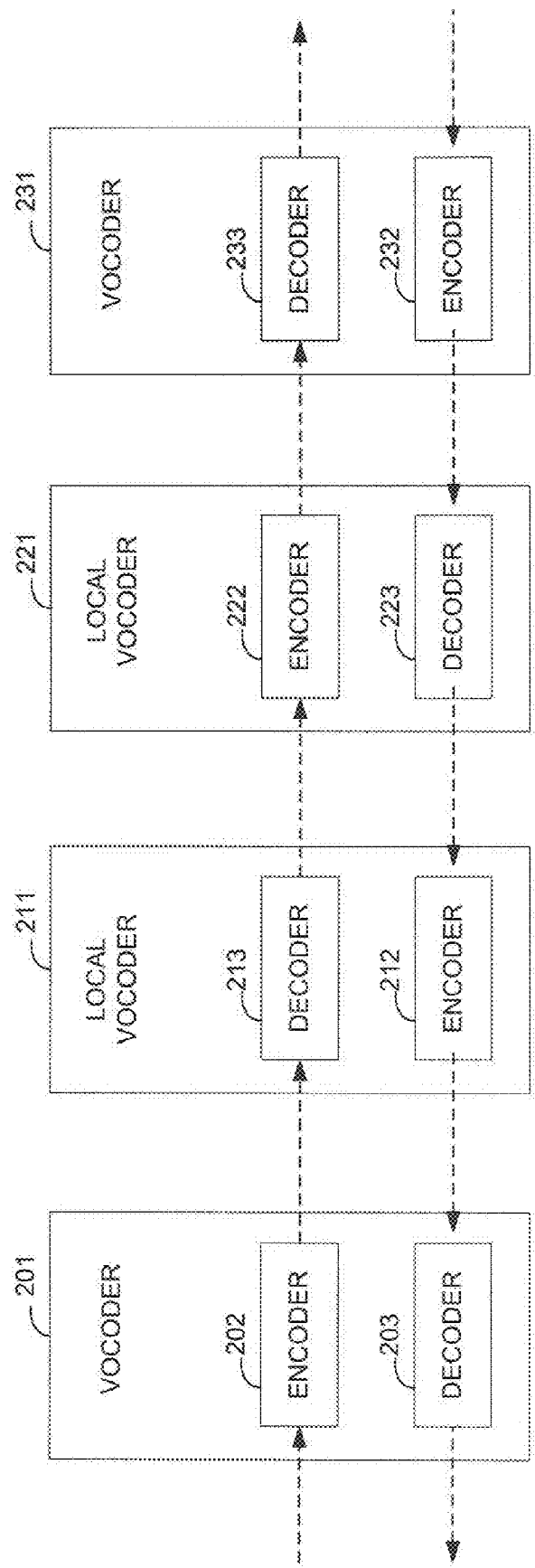
FIG. 2 is a block diagram of the encoding and decoding functions performed by various vocoders located within communications equipment of FIG. 1.

FIG. 2 is a block diagram of the encoding and decoding functions performed by various vocoders located within the communications equipment of the wireless communication system of FIG. 1. Remote station or terminal 12a is a communication device comprising a vocoder 201 with encoding portion 202 and decoding portion 203. Analog voice is received by the remote terminal 12a and is encoded by the encoding portion 202 into packetized data. Packetized data is transmitted to a base station 14a. A decoding portion 213 of a vocoder 211, converts the packetized data into a standard pulse code modulated signal (PCM) for transmission on the PSTN (not shown). The PCM signal is transmitted over the PSTN to a target base station 14b, which alerts the target remote terminal 12b. The encoding portion 222 of a vocoder 221 at the target base station 14b encodes the PCM signal into packetized data, for transmission to a remote terminal 12b. The decoding portion 233 of a vocoder 231 at the remote terminal 12b decodes the packetized data and forms synthesized speech.

The process described above is also used to transmit signals from remote terminal 12b to remote terminal 12a. The use of multiple vocoders as illustrated by FIG. 2 is termed "tandem vocoding." A degradation of the speech signal occurs due to the multiplicity of encoding and decoding functions performed upon the speech signal. Tandem vocoding can be bypassed if the vocoder at the originating terminal has the same configuration as the vocoder at the target destination. Implementation details of vocoder bypass are described in U.S. Pat. No. 5,956,673, entitled, "Detection and Bypass of Tandem Vocoding Using Detection Codes," assigned to the assignee of the present invention and incorporated by reference herein. In particular, a pseudorandom detection code can be embedded within the PCM output so that a receiving vocoder with the correct service option programming can detect the code and thereby conclude that the originating party utilized a similar vocoder. If the vocoders of the remote terminals are the same, then the decoder of the target remote terminal can decode the encoded speech generated by the originating remote terminal. However, if the vocoders are dissimilar, then a bypass of the tandem vocoding could not be implemented in the prior art.

The embodiments that are described herein are for harmonizing the operations of different vocoders so that tandem-free operations, i.e., vocoder bypass, can be implemented between non-compatible systems. As used herein, a non-compatible system can be considered one that uses a different access technology from the originating system. For example, CDMA-based systems and TDMA-based systems are considered non-compatible herein. In general, the embodiments are direct towards the transportation of variable-rate or multi-rate vocoder frame contents in a format that is accessible to the infrastructure entities of both the originating and terminating systems.

It should first be noted that tandem-free operations (TFO) is essential in order to achieve the full acoustical benefits of wideband vocoding between two terminals. A wideband signal requires a data capacity of 128 kbps (16,000 samples/second×8 bits/sample), but a narrowband transmission channel can only supply of a capacity of 64 kbps. In order to overcome this problem, certain "in-path" equipment of the infrastructure entities, such as echo cancellers, etc., should be disabled and the encoder at a transmitting infrastructure entity should produce an adulterated PCM signal. Specifically, an originating terminal encodes a wideband input signal into vocoder frames and transmits the vocoder frames to an originating infrastructure entity. The originating infrastructure entity decodes the received vocoder frames and generates PCM symbols based on the decoded signal. The originating infrastructure entity then punctures the received vocoder frame bits into the stream of generated PCM symbols. In other words, the stream of generated PCM symbols are altered by the inclusion of the vocoder frame bits.

By convention, a PCM symbol is 8 bits long. In one method, the stream of PCM symbols are altered by replacing the two least significant bits of the PCM symbols with two bits of the received vocoder frames. At a target infrastructure entity, the two least significant bits are extracted and used to reconstruct the vocoder frames. The other 6 bits of the PCM symbol are discarded, or alternatively, the other bits are saved in case the tandem-free connection fails.

At the target infrastructure entity, the reconstructed vocoder frames are passed directly to the target terminal. The procedures and apparatus required to pass a vocoder frame from a non-compatible infrastructure entity to a non-compatible target terminal is described in U.S. patent application Ser. No. 10/252,880, now U.S. Pat. No. 7,023,880. In the aforementioned U.S. Patent Applications, the vocoder frames are passed between vocoders of non-compatible systems by re-formatting the vocoder frames at the infrastructure entities, as opposed to translating the vocoder frames. The details of the re-formatting will not be discussed further herein.

The embodiments described herein relate to the procedures and devices at the originating infrastructure entity to puncture the PCM symbols with vocoder frame bits, and the procedures and devices at the target infrastructure entity to extract the vocoder frame bits from the punctured PCM symbols. The set-up procedures for establishing the tandem-free operation are not the subject of the present document.

In one embodiment, a vocoder frame is re-packaged into a special TFO frame that is punctured into a plurality of PCM symbols. In one aspect of the embodiment, new tables are created that redefines the control bits of an already existing transmission channel frame in order to generate the special TFO frame. In another embodiment, decoding subsystems of non-compatible parties are implemented within an infrastructure entity such that received transmission channel frames are checked for non-compatible vocoder frame contents and routed to the appropriate decoding subsystem.

In the first embodiment, an infrastructure entity in the originating infrastructure entity receives a vocoder frame and generates a TFO frame. The hardware that performs this task is generically referred to as a TFO Frame Generator herein, and may comprise any appropriately configured processing entity. Similarly, software can be implemented to perform the functions of a TFO Frame Generator. The generic TFO frame structure that is output from the TFO Frame Generator is shown below.

| TFO Frame Structure | | | | | | | | |
|---|---|---|---|---|---|---|---|---|
| | Bits | | | | | | | |
| Octets | 1 | 2 | 3 | 4 | 5 | 6 | 7 | 8 |
| 0 | SYSTEM IDENTIFIER BITS, | | | | | | | |
| 1 | DATA BITS & CONTROL BITS | | | | | | | |
| 2 | | | | | | | | |
| ... | | | | | | | | |
| 39 | | | | | | | | |

In the above example, the TFO frame comprises 40 octets, which has 320 bits. Data bits and control bits from the received vocoder frame are strategically embedded in the TFO frame structure. Specific bit positions correspond to specific functions. For example, the bit positions in the first octet may be reserved for a system identifier, the bit positions in the second third of the octets may be reserved for data only, i.e., the bits of the vocoder frame, and the bits from the last third of the octets may be reserved for control bits from the originating infrastructure entity to the target infrastructure entity. Hence, each bit position has a defined meaning. 320 bits are sufficient to carry one vocoder frame. For example, a wideband vocoder outputs 267 bits for a 20 ms analysis frame. Hence, one TFO frame may correspond to one vocoder frame.

After the TFO frame is generated or while the TFO frame is being generated, an infrastructure entity in the originating infrastructure entity decodes the received vocoder frame into speech and generates PCM symbols using the decoded speech. Since the originating infrastructure entity will need bits from the PCM symbol to carry the TFO frame, the PCM waveform should be represented with a codebook with 26 levels, rather than a codebook with 28 levels. Hence, there is an increase in the quantization error. The infrastructure entity then starts appending the generated TFO frame to the generated PCM symbols. Alternatively, the infrastructure entity may maintain the larger PCM codebook and simply "puncture" the PCM symbol at least once in some designated spot. In either case, the PCM symbols will most likely be transmitted in 20 ms TFO transmission frames, since each 20 ms frame can carry 160 symbols, which suffices to carry 320 TFO frame bits.

The purpose of generating a PCM signal from the decoded vocoder frame is not due towards any technical constraints, but due to legal constraints. The transmission of the PCM signal is necessary only for compliance with a federal mandate that requires the accessibility of inter-party communications by appropriate law enforcement authorities.

At the target infrastructure entity, the altered PCM symbols are received and the bits of the TFO frames are extracted. The extraction can be performed by any hardware, which is appropriately configured to perform the extraction function. Alternatively, software can be implemented by a processing entity and memory to perform the extraction function. For illustrative purposes, the hardware/software will be referred to as a TFO Frame Extractor herein. Note that the target infrastructure entity is aware of the presence of the TFO bits by the call-setup procedure that is the subject of the aforementioned co-pending U.S. Patent Application. The TFO Frame Extractor can further be configured to re-construct the TFO frame from the extracted bits. From the reconstructed TFO frame, the bits of the vocoder frame are extracted and re-arranged into the vocoder frame. Again, the extraction of the vocoder bits can be performed by any hardware/software that is appropriately configured to perform the extraction function. For illustrative purposes, the hardware or software alternative will be referred to as a Vocoder Frame Extractor. The vocoder frame is then further re-formatted for transmission to the target terminal. Note that the functions of the TFO Frame Extractor and the Vocoder Frame Extractor could be merged within a single functional entity, if so desired.

In the embodiment described above, the TFO Frame Generator is configured to generate two different types of TFO frames according to the source of the vocoder frame. If the source of a vocoder frame is a variable-rate vocoder and the target terminal is within a GSM or UMTS system, or if the source of a vocoder frame is a multi-rate vocoder and the target terminal is within a CDMA system, then special control bits are inserted into the TFO frame according to the source type. Hence, the decoder at the target infrastructure entity should be configured to properly interpret the control bits in a given TFO frame. Decoder configuration details are presented below in conjunction with hardware configurations.

The TFO frame could be thought of as a table, wherein the specific bit positions convey information as to system parameters. For example, the bit positions in one location could identify a mode of operation for the originating vocoder, the bit positions in another position could identify vocoder type, and the bit positions in yet another position could identify the codebook used by the vocoder. This perception of the TFO frame is in line with the interpretation of a typical transmission frame. However, an important difference exists in that these TFO frames have control bits that are not interpreted in the same way that the normal transmission frames are interpreted.

The embodiments are directed to various alterations at the infrastructure entities of the non-compatible systems, and more specifically, at transmit and receive subsystems of the infrastructure entities. The embodiments envision flexible transmission subsystem and receive subsystems that can alternatively select between normal transmission frame formats and TFO frame formats of inter-system wideband vocoder frame bits. Moreover, the generation and extraction of the TFO frames that carry wideband vocoder frame bits can be simplified by the appropriation of already existing tables for TFO frame formats of intra-system vocoder frame bits.

Tfo Frame Generators and Extractors

Figure 3:
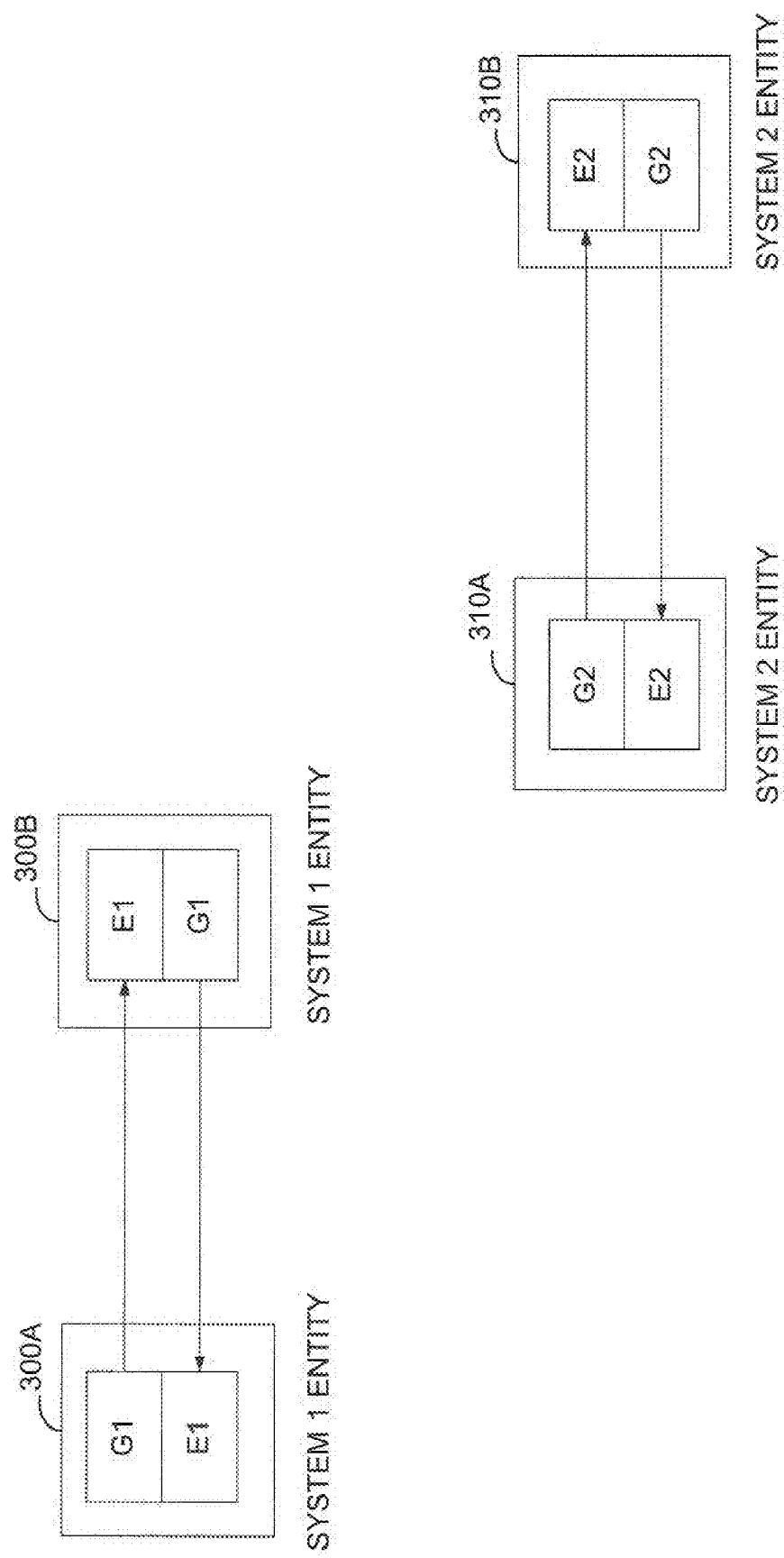
FIG. 3 is a block diagram of a generic setup for intra-system vocoder bypass within System 1 and System 2.

In order to implement the ideas and concepts described herein, the transmission and receiver subsystems at the originating and terminating infrastructure entities must be appropriately configured. In order to perform an intra-system vocoder bypass, each infrastructure entity within a network should have a TFO Frame Generator that can generate a TFO frame and a TFO Frame Extractor that can process a received TFO frame. (For illustrative purposes only, the Vocoder Frame Extractor is not included in the examples that follow.) FIG. 3 illustrates a generic setup for intra-system vocoder bypass.

The infrastructure entities $300a$, $300b$ of System 1 are each configured to have a TFO Frame Generator $G_1$ and a TFO Frame Extractor $E_1$ to perform intra-system vocoder bypass. The infrastructure entities $310a$, $310b$ of System 2 are each configured to have a TFO Frame Generator $G_2$ and a TFO Frame Extractor $E_2$ to perform intra-system vocoder bypass. The embodiments that follow below are directed towards altering already existing tables that are used for implementing intra-system TFO within each system. However, in order to perform an intersystem vocoder bypass, the infrastructure entities in the different communication systems should comprise at least one of the configurations illustrated in FIGS. 4 through 7.

Figure 4:
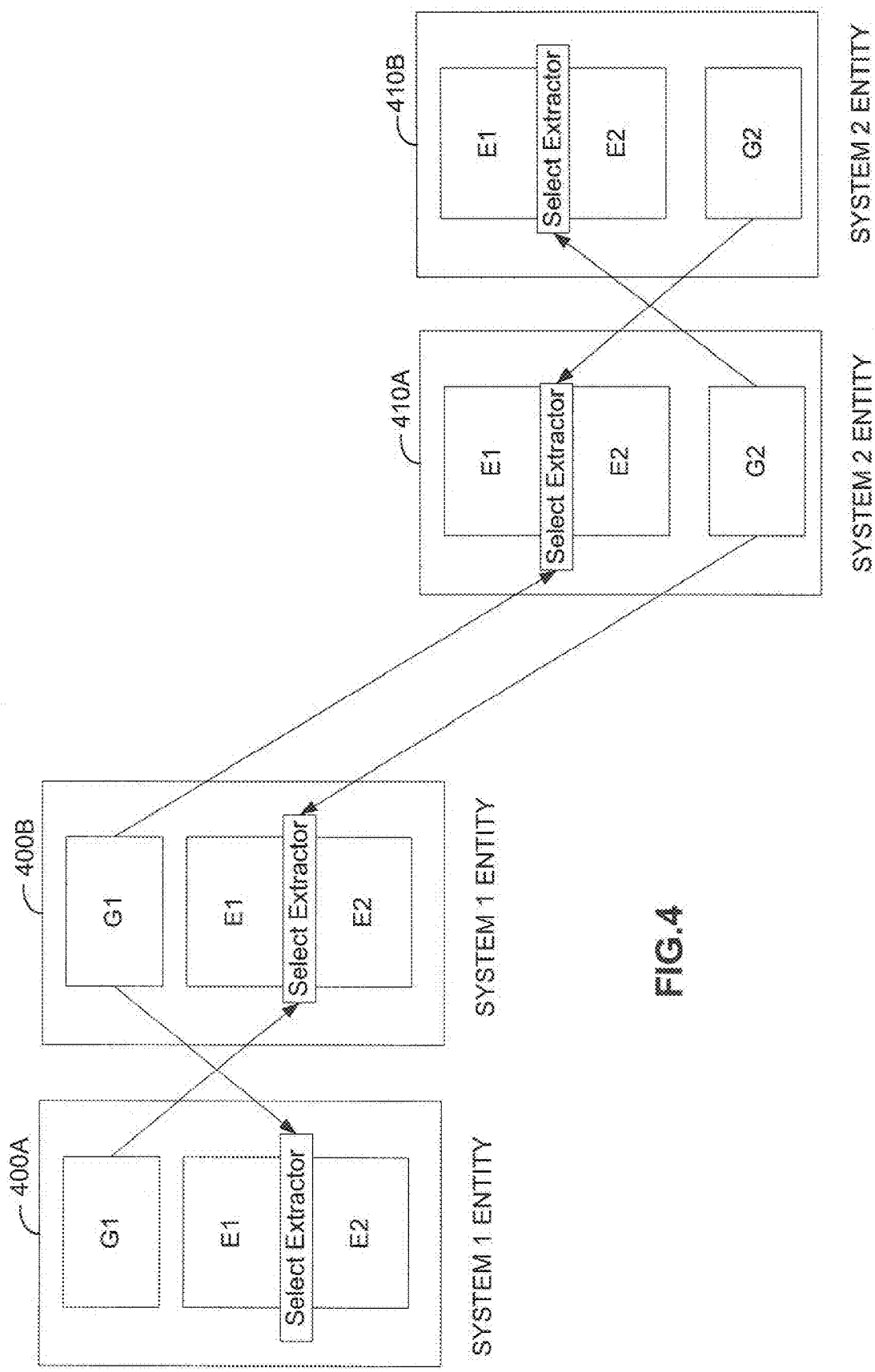
FIG. 4 is a block diagram of hardware for generating intra-system TFO frames and receiving intra-system/intersystem TFO frames.

FIG. 4 is a block diagram illustrating an embodiment wherein hardware for generating intra-system TFO frames and hardware for receiving intra-system and intersystem TFO frames are implemented at all infrastructure entities of the non-compatible systems. In this embodiment, each infrastructure entity $400a$, $400b$ in System 1 comprises an intra-system TFO Frame Generator $G_1$, an intra-system TFO Frame Extractor $E_1$, and a TFO Frame Extractor $E_2$ of System 2, which is non-compatible to System 1. Each infrastructure entity $410a$, $410b$ in System 2 comprises an intra-system TFO Frame Generator $G_2$, an intra-system TFO Frame Extractor $E_2$, and a TFO Frame Extractor $E_1$ of System 1.

With this embodiment, each infrastructure entity is fitted with a TFO Frame Extractor of another system. The intra-system TFO Frame Extractor need not be altered. A switching entity should be cooperatively coupled to the different TFO Frame Extractors in order to select the extractor that is appropriate to the contents of the TFO frames, i.e., either intra-system vocoder frame bits or intersystem vocoder frame bits. Any hardware or software configuration that can be configured to select between the extractors can be implemented. Note that each extractor would use different tables to determine the interpretation of bits in specific locations of the TFO frame. Hence, an alternate embodiment could be a single extractor implemented with two tables, wherein a selection element determines which table is used by the extractor, according to the source type of the received TFO frame. This alternate embodiment can be implemented for any of the embodiments described below.

Figure 5:
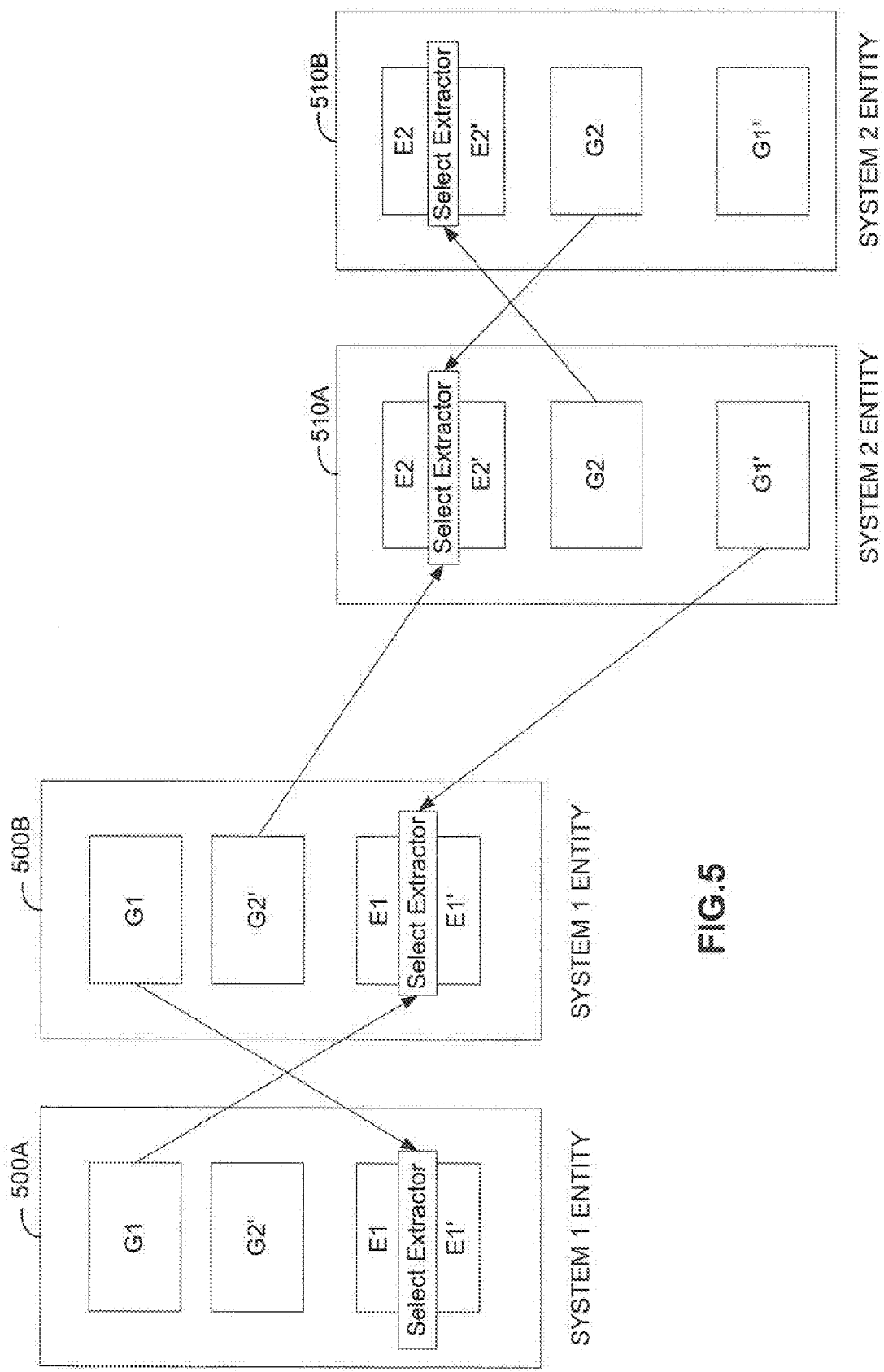
FIG. 5 is a block diagram of hardware for generating intra-system/intersystem TFO frames and receiving intra-system TFO frames.

FIG. 5 is a block diagram illustrating an embodiment wherein hardware for generating intra-system and intersystem TFO frames and hardware for receiving intra-system TFO frames are implemented at all infrastructure entities of the non-compatible systems. In this embodiment, each infrastructure entity 500a, 500b in System 1 comprises an intra-system TFO Frame Generator $G_1$, an intra-system TFO Frame Extractor $E_1'$, and a TFO Frame Generator $G_2'$ of System 2, which is non-compatible to System 1. Each infrastructure entity 510a, 510b in System 2 comprises an intra-system TFO Frame Generator $G_2$, an intra-system TFO Frame Extractor $E_2$, an inter-system TFO Frame Extractor $E_2'$, and a TFO Frame Generator $G_1'$ of System 1.

As used herein, the superscript mark indicates that the extractor or generator is modified to receive vocoder frames from another system's vocoder. For example, if System 1 is a CDMA system and System 2 is a GSM system, then TFO Frame Generator $G_2$ would be configured to receive a multi-rate vocoder frame. However, the direct placement of $G_2$ in a CDMA system would cause problems, in that $G_2$ would not be configured to receive variable-rate vocoder frames. Hence, $G_2$ would have to be modified into $G_2'$, which is capable of receiving a variable-rate vocoder frame and still be able to generate a GSM-compliant TFO frame format.

Modification can take the form of alternative tables, wherein additional identification codes are created, different CRC polynomials are utilized, and the discontinuous/continuous (DTX/CTX) transmission indicator bit is disabled. (DTX/CTX is a characteristic of multi-rate vocoders that is not found in variable-rate vocoders.) The alternate tables redefine the function of the bits in specific locations of the TFO frame. For example, bits representing AMR-WB modes can be placed in a modified frame table based on a WB-SMV TFO frame table. As discussed earlier, the TFO frame formats for an intra-system WB-SMV bypass are already defined. There are no designated bit locations in the intra-system WB-SMV TFO frame format for AMR-WB mode bits. In this embodiment, the function of certain bit positions in the WB-SMV TFO frame table are redefined, so that the AMR-WB mode bits can be conveyed at these bit positions, and vice versa.

For example, bit position 2 in the third octet might be interpreted as a data bit according to a given table for an intra-system WB-SMV TFO frame. However, if the WB-SMV intra-system TFO frame is to be used as an inter-system TFO frame for an AMR-WB target destination, then the infrastructure entity in the CDMA system may use an alternate, AMR-WB table that defines bit position 2 in the third octet as a control bit. Hence, the infrastructure entity would have hardware and/or software for commandeering already existing intra-system frame formats for functionality in a foreign system.

If the TFO Frame Generator $G_2'$ is modified from $G_2$, then the receiver subsystem at System 2 would need to be able to properly read the TFO frame generated by $G_2'$. The receiver at System 2 would also need to be able to read intra-system TFO frames as well.

Note that this embodiment enables an infrastructure entity to receive intra-system TFO frames and slightly modified intra-system TFO frames. There is no need for the infrastructure entity to receive another system's intra-system TFO frame, which most likely has a completely non-compatible format.

Figure 6:
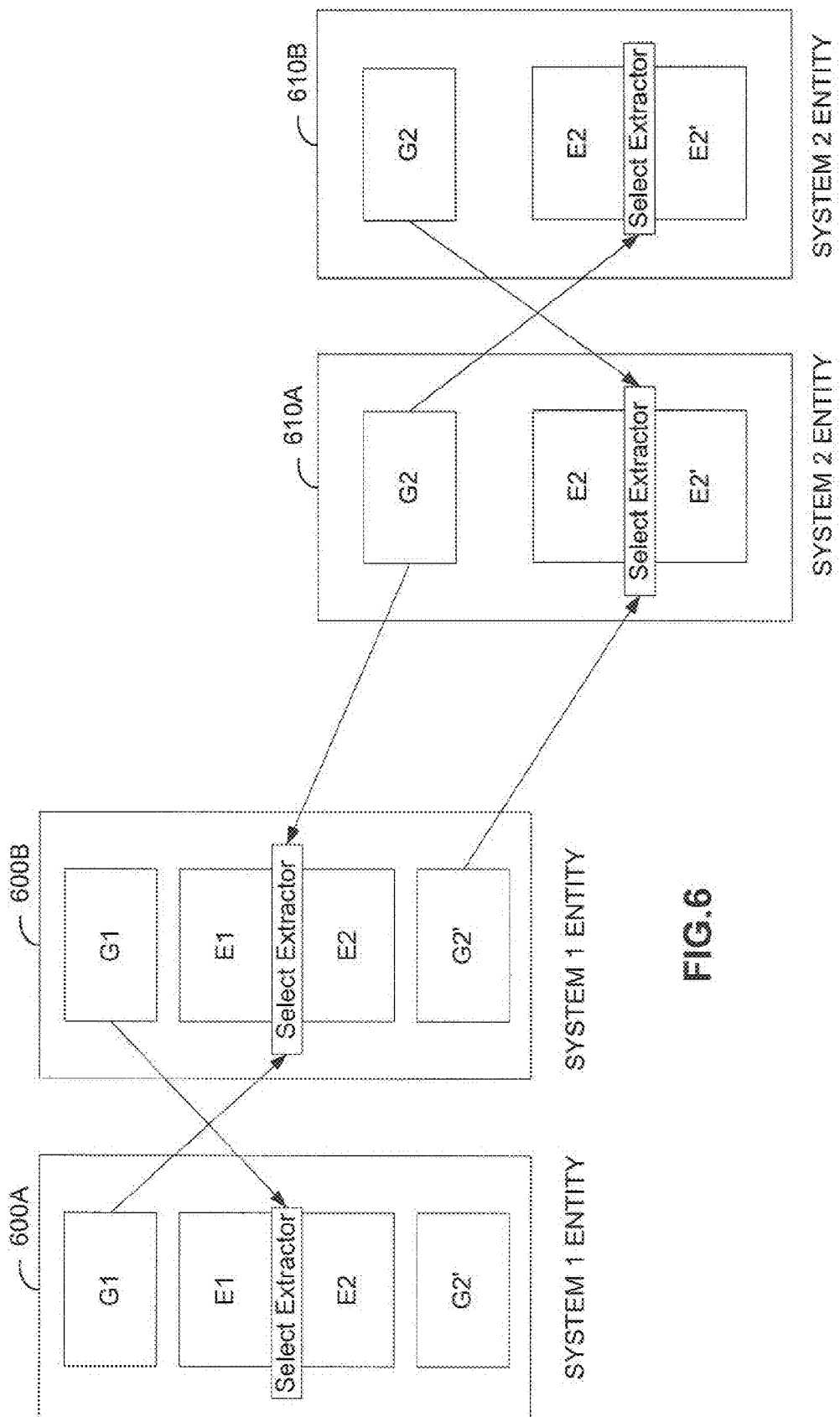
FIG. 6 is a block diagram of hardware for generating and receiving intra-system/intersystem TFO frames at an originating system and receiving inter-system TFO frames at a target system.

FIG. 6 is a block diagram illustrating an embodiment wherein hardware for generating and receiving intersystem and intra-system TFO frames is present at the originating system, and hardware for generating intra-system TFO frames and receiving intersystem TFO frames is present at the terminating system. In this embodiment, each infrastructure entity 600a, 600b in System 1 comprises an intra-system TFO Frame Generator $G_1$, an intra-system TFO Frame Extractor $E_1$, a TFO Frame Generator $G_2'$ of System 2, and a TFO Frame Extractor $E_2$ of System 2. Each infrastructure entity 610a, 610b in System 2 comprises an intra-system TFO Frame Generator $G_2$ and an intra-system TFO Frame Extractor $E_2'$.

Figure 7:
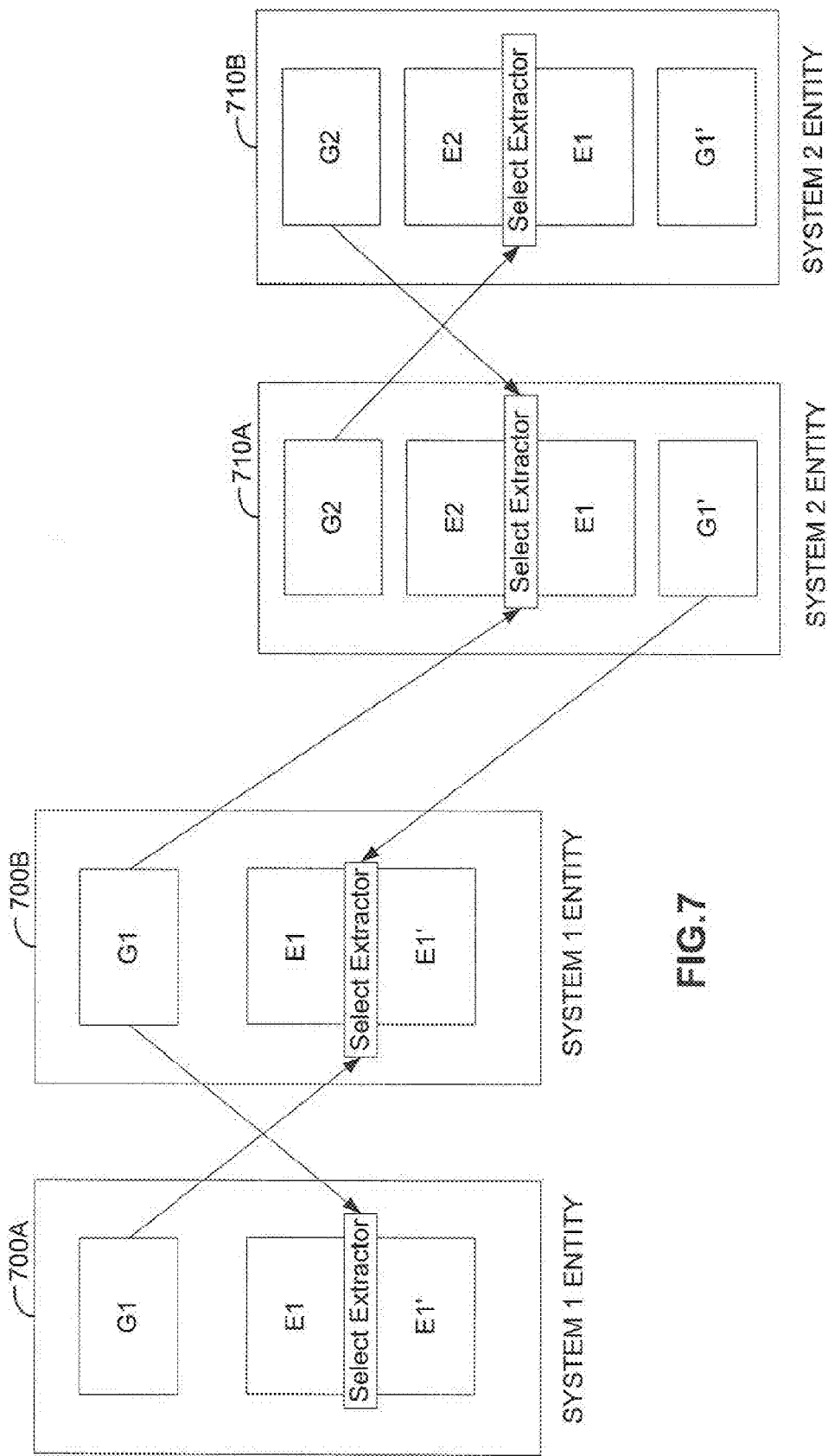
FIG. 7 is a block diagram of another hardware configuration for generating and receiving intra-system/intersystem TFO frames.

FIG. 7 is a block diagram illustrating an embodiment wherein hardware for generating intra-system TFO frames and receiving intersystem TFO frames are implemented at an originating system, and hardware for generating and receiving intra-system and inter-system TFO frames is present at a terminating system. In this embodiment, each infrastructure entity 700a, 700b in System 1 comprises an intra-system TFO Frame Generator $G_1$ and an intra-system TFO Frame Extractor $E_1'$. Each infrastructure entity 710a, 710b in System 2 comprises an intra-system TFO Frame Generator $G_2$, an intra-system TFO Frame Extractor $E_2$, a TFO Frame Generator $G_1'$ of System 1, and a TFO Frame Extractor $E_1$ of System 1.

Figure 8A:
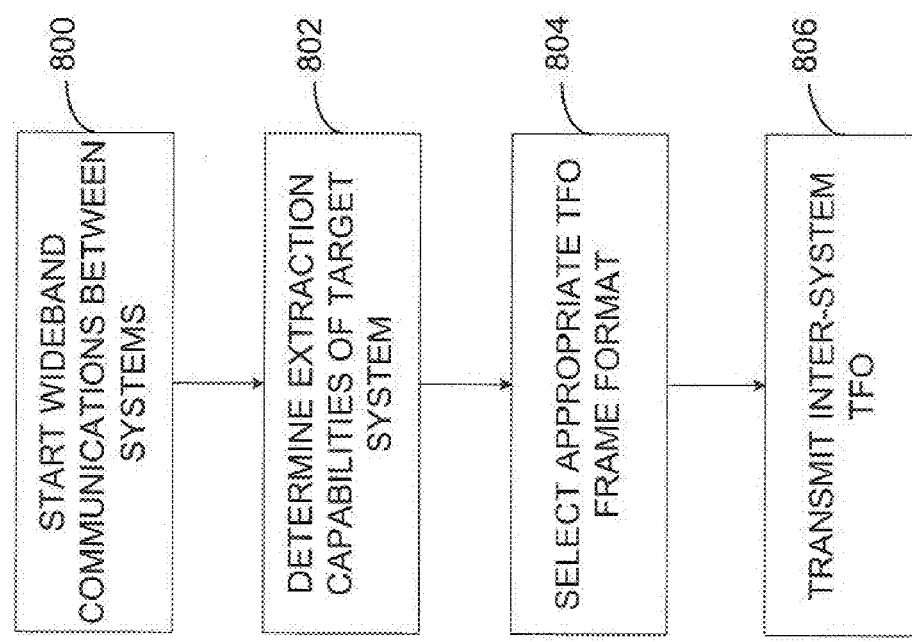
FIGS. 8A and 8B are flowcharts illustrating the operation of harmonized TFO between communication systems.
Figure 8B:
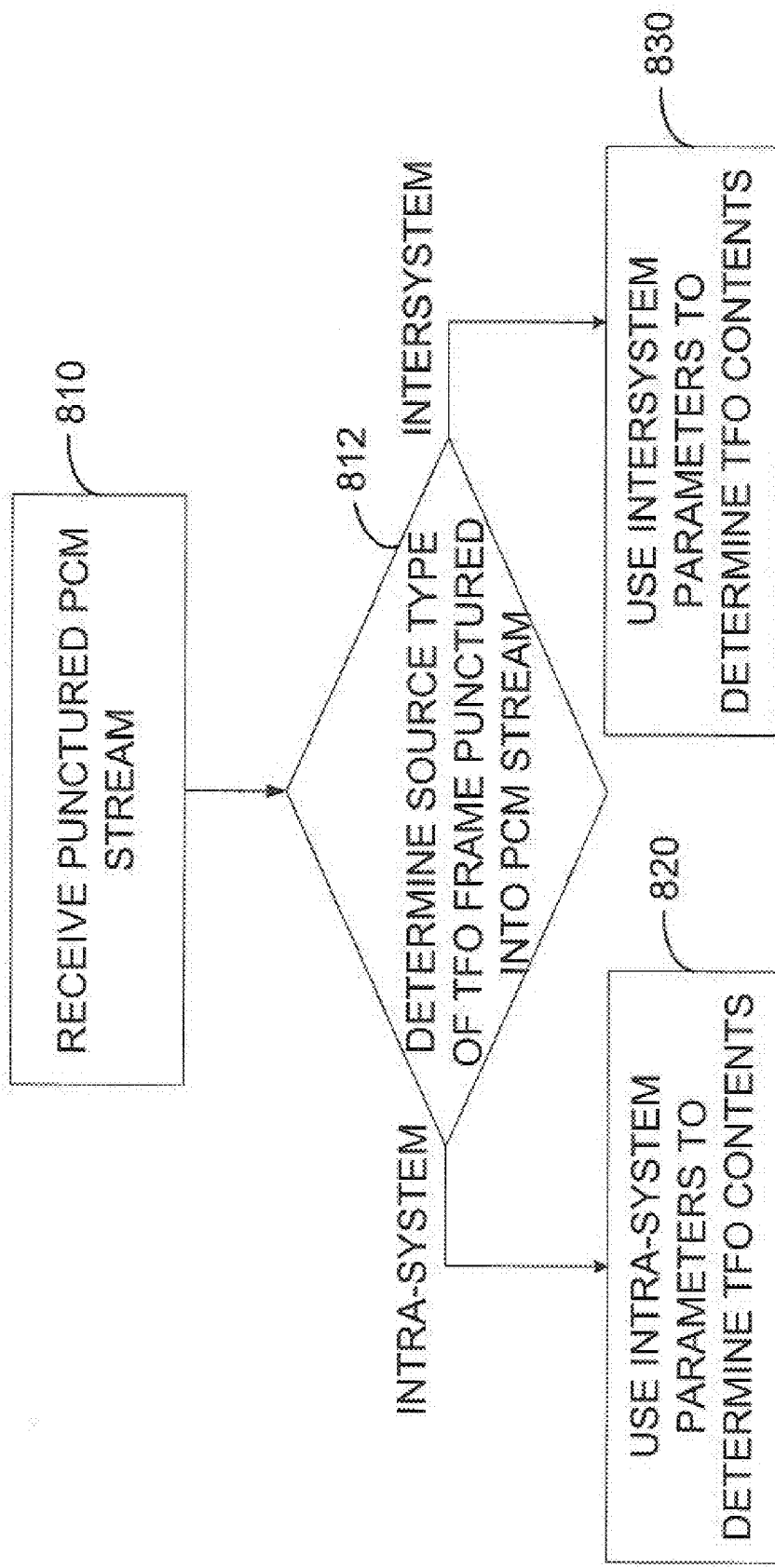

FIGS. 8A and 8B is a flowchart describing the methodology of the above embodiments. FIG. 8A describes the generation of a TFO frame at an originating system and FIG. 8B describes the extraction of a TFO frame at a target system.

At step 800 of FIG. 8A, a determination is made that wideband communications should commence between a terminal of a first communication system and a target terminal of a non-compatible communication system.

At step 802, a TFO Frame Generator of the first system determines the extraction capabilities of the second system.

Based upon the decision at step 802, the TFO Frame Generator selects at step 804 an appropriate TFO frame format for conveying vocoder bits from the terminal of the first communication system to the target terminal.

At step 806, the inter-system TFO frame is transmitted to an infrastructure entity of the second communication system, wherein the infrastructure entity supports the target terminal.

At step 810 of FIG. 8B, the infrastructure entity of the second communication system begins to receive a TFO frame punctured into a PCM stream. At step 812, the infrastructure entity determines the source type of the TFO frame. If the source type is that of an intra-system TFO frame, then the program flow proceeds to step 820. If the source type is that of an intersystem TFO frame, then the program flow proceeds to step 830.

At step 820, the infrastructure entity proceeds to extract TFO frame bits from the punctured PCM stream and determines the contents of the TFO frame according to an intra-system specification.

At step 830, the infrastructure entity proceeds to extract TFO frame bits from the punctured PCM stream and determines the contents of the TFO frame according to intra-system TFO parameters of the first communication system.

The decision made at Step 812 is based upon a system that is configured with multiple extraction elements, each configured with the intra-system TFO parameters of a foreign system. It should be noted that Step 812 and Step 830 need not be implemented if the first communication system incorporates the intra-system TFO parameters of the second communication system and is capable of transmitting TFO frames of the second communication system.

For clarity, various aspects, embodiments, and features of the invention have been described for a specific implementation for a W-CDMA system and a cdma2000 system. However, other fixed-rate, multi-rate and variable-rate systems and standards may advantageously be implemented or adopted to support the embodiments described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of determining tandem-free operation (TFO) contents in a TFO frame comprising:
   receiving a TFO frame comprising a punctured PCM stream, wherein TFO contents is punctured into the PCM stream;
   extracting a source type parameter from a predetermined location in the TFO frame to determine a TFO source type;
   extracting intra-system parameters from the TFO frame to determine the TFO contents if the TFO source type is intra-system; and
   extracting intersystem parameters from the TFO frame to determine the TFO contents if the TFO source type is intersystem.

2. The method of claim 1 wherein extracting intra-system parameters comprises:
   locating an intra-system parameter in the TFO frame based on the TFO source type and a first predetermined table; and
   extracting the intra-system parameter.

3. The method of claim 1 wherein extracting intersystem parameters comprises:
   locating an intersystem parameter in the TFO frame based on the TFO source type and a second predetermined table; and
   extracting the intersystem parameter.

4. The method of claim 1 wherein the punctured PCM stream comprises a plurality of PCM symbols wherein the plurality of PCM symbols are altered by replacing a predetermined number of least significant bits with received vocoder frame bits.

5. The method of claim 1 wherein the source type identifies a vocoder selected from the group consisting of GSM vocoder, UMTS vocoder, CDMA vocoder, and W-CDMA vocoder.

6. An apparatus for determining tandem-free operation (TFO) contents in a TFO frame comprising:
   a processor;
   memory in electronic communication with the processor; and
   instructions stored in the memory, the instructions being capable of executing the steps of:
      receiving a TFO frame comprising a punctured PCM stream, wherein TFO contents is punctured into the PCM stream;

extracting a source type parameter from a predetermined location in the TFO frame to determine a TFO source type;

extracting intra-system parameters from the TFO frame to determine the TFO contents if the TFO source type is intra-system; and extracting intersystem parameters from the TFO frame to determine the TFO contents if the TFO source type is intersystem.

7. The apparatus of claim 6 wherein the memory further comprises instructions, the instructions being capable of executing the steps of:

locating an intra-system parameter in the TFO frame based on the TFO source type and a first predetermined table; and extracting the intra-system parameter.

8. The apparatus of claim 6 wherein the memory further comprises instructions, the instructions being capable of executing the steps of:

locating an intersystem parameter in the TFO frame based on the TFO source type and a first predetermined table; and extracting the intersystem parameter.

9. The apparatus of claim 6 wherein the punctured PCM stream comprises a plurality of PCM symbols wherein the plurality of PCM symbols are altered by replacing a predetermined number of least significant bits with received vocoder frame bits.

10. The apparatus of claim 6 wherein the source type identifies a vocoder selected from the group consisting of GSM vocoder, UMTS vocoder, CDMA vocoder, and W-CDMA vocoder.

11. An apparatus for determining tandem-free operation (TFO) contents in a TFO frame comprising:

means for receiving a TFO frame comprising a punctured PCM stream, wherein TFO contents is punctured into the PCM stream;

means for extracting a source type parameter from a predetermined location in the TFO frame to determine a TFO source type;

means for extracting intra-system parameters from the TFO frame to determine the TFO contents if the TFO source type is intra-system; and means for extracting intersystem parameters from the TFO frame to determine the TFO contents if the TFO source type is intersystem.

12. The apparatus of claim 11 wherein means for extracting intra-system parameters comprises:

means for locating an intra-system parameter in the TFO frame based on the TFO source type and a first predetermined table; and means for extracting the intra-system parameter.

13. The apparatus of claim 11 wherein means for extracting intersystem parameters comprises:

means for locating an intersystem parameter in the TFO frame based on the TFO source type and a second predetermined table; and means for extracting the intersystem parameter.

14. The apparatus of claim 11 wherein the punctured PCM stream comprises a plurality of PCM symbols wherein the plurality of PCM symbols are altered by replacing a predetermined number of least significant bits with received vocoder frame bits.

15. The apparatus of claim 11 wherein the source type identifies a vocoder selected from the group consisting of GSM vocoder, UMTS vocoder, CDMA vocoder, and W-CDMA vocoder.

16. A memory storing a computer program that, when executed, causes a computer to perform the acts of:

receiving a TFO frame comprising a punctured PCM stream, wherein TFO contents is punctured into the PCM stream;

extracting a source type parameter from a predetermined location in the TFO frame to determine a TFO source type;

extracting intra-system parameters from the TFO frame to determine the TFO contents if the TFO source type is intra-system; and extracting intersystem parameters from the TFO frame to determine the TFO contents if the TFO source type is intersystem.

\* \* \* \* \*